United States Patent [19]

Tateoka

[11] Patent Number: 4,661,858
[45] Date of Patent: Apr. 28, 1987

[54] READING APPARATUS

[75] Inventor: Masamichi Tateoka, Yokohama, Japan

[73] Assignee: Canon Kabushiki Kaisha, Tokyo, Japan

[21] Appl. No.: 703,498

[22] Filed: Feb. 20, 1985

[30] Foreign Application Priority Data

Feb. 28, 1984 [JP] Japan ................................ 59-35430
Jul. 26, 1984 [JP] Japan ............................. 59-157885

[51] Int. Cl.⁴ ............................................ H04N 1/04
[52] U.S. Cl. ................................ 358/284; 358/282; 358/285
[58] Field of Search ............... 358/280, 282, 284, 285, 358/293, 294; 250/216

[56] References Cited

U.S. PATENT DOCUMENTS 4,383,170  5/1983  Takagi et al. ...................... 250/216
4,415,934 11/1983  Konishi ............................. 358/294
4,503,461  3/1985  Nishimura ..................... 358/284 X

FOREIGN PATENT DOCUMENTS 0135217 11/1978  Japan ................................. 358/294
0092069  7/1980  Japan ................................. 358/284

Primary Examiner—Michael A. Masinick

[57] ABSTRACT

An apparatus for reading the image of an original comprises a imaging device for forming the image of the original, an image pickup device provided at a position where the image is formed by the imaging device, the image pickup device photoelectrically converting the image of the original into an electrical signal, and a device for separating the light beam from the original disposed between the original and the image pickup device, a plurality of images of the original being formed on the image pickup device by the separating device.

11 Claims, 6 Drawing Figures

Fig. 1
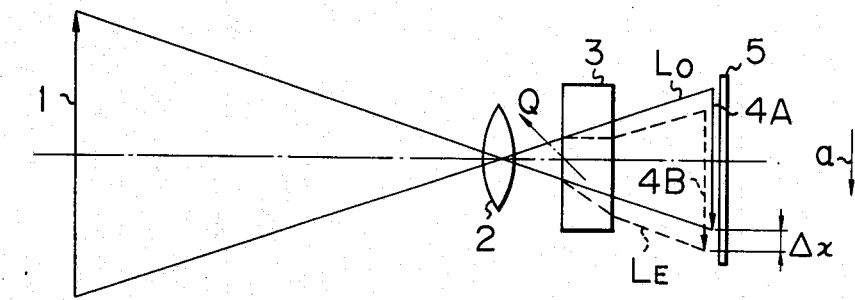
Fig. 2
| 16 | 5 | 6 | 13 |
|----|---|---|----|
| 12 | 1 | 2 | 7 |
| 11 | 4 | 3 | 8 |
| 15 | 10 | 9 | 14 |
Fig. 3
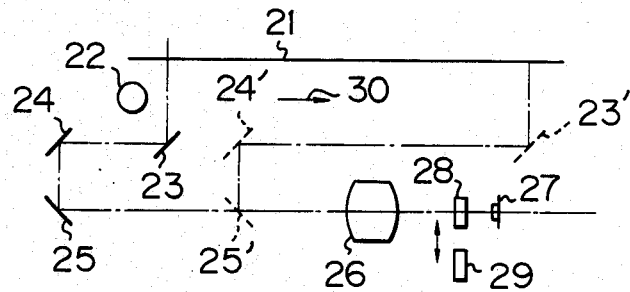

READING APPARATUS

BACKGROUND OF THE INVENTION

1. Field of the Invention

This invention relates to an original reading apparatus using a solid state image pickup device, and more particularly to a reading apparatus suitable for an image forming apparatus of the type which reproduces images by accumulation of point images, such as a laser beam printer or a light-emitting diode printer.

2. Description of the Prior Art

In an original reading apparatus, the image of an original is formed on a solid stage image pickup device (such as a CCD) on which a great number of photoelectric conversion elements are densely arranged, and this image is electrically scanned on said device and converted into a time-serial electrical signal. When the image is to be reproduced by the use of this signal, the so-called dither system is often adopted to reproduce tone or gradation.

Various originals include so-called net-point originals. Because of the beats of the period of the net points of such a net-point original with the picture elements (photoelectric conversion elements) of the solid state image pickup device (or in a systematic dither method, the period of the minimum picture element in which a plurality of picture elements such as $4\times4$ or $8\times8$ picture elements are constructed in a lump), there is caused regular unevenness. That is, moiré is created by the interference between the spatial net-point frequency of the image (already made into net points) and the spatial scanning line frequency of the minimum picture element constituted by the picture elements by the image pickup device. The moiré frequency (the frequency of the moiré so created) and the moiré amplitude (the width of the moiré) depend on a number of parameters, of which the size of the net points, the angle of the screen, the size of the minimum picture element and the kind of the dither are the most important. The moiré appearing in the reproduced image proves a great hindrance and remarkably deteriorates the quality of the image, and therefore, numerous proposals have already been made to prevent moiré during the reproduction of images. For example, a method of transforming into noise a scanning threshold value for effecting image scanning is already known. In this method, a noise signal is added to a threshold value reference signal and thus, again in this case, the image becomes unstable and moreover, the quality of the image is deteriorated.

Also, originals having harmonic tones such as photographs or net-point originals, and originals, having no harmonic tone such as characters or the like, must be read well.

SUMMARY OF THE INVENTION

It is an object of the present invention to provide an original reading apparatus of simple construction which can reduce created moiré even when a net-point original is read and the image thereof is reproduced, that is, can reduce the appearance of moiré to such a degree that it offers practically no problem.

It is a further object of the present invention to provide a reading apparatus which reads an original with a sufficient resolving power in accordance with the kind of the original and reduces noise such as moiré.

In the reading apparatus according to the present invention, an optical low-pass filter is disposed in the optical path of an optical system for forming the image of an original on an image pickup device, whereby creation of moiré is prevented. This optical low-pass filter separates the incident light beam into two or more light beams, and by so disposing this low-pass filter, a plurality of images of the original are formed on the image pickup element slightly deviated from each other.

Further, in the reading apparatus according to the present invention, when an original which will create no moiré is to be read, said low-pass filter is retracted out of the optical path of the imaging optical system, and there is provided optical path length correcting means for correcting the variation in the length of the optical path between the original and the image pickup device caused by the removal of the low-pass filter, and for bringing the surface of the original and the image pickup device into an optically conjugate relation with respect to the imaging optical system. As this optical path length correcting means, an optical member, for example, a reflecting mirror, disposed between the original and the image pickup device may be moved, or a transparent member having an optical path length equivalent to that of said low-pass filter may be inserted into the optical path when the low-pass filter is retracted out of the optical path.

BRIEF DESCRIPTION OF THE DRAWINGS

FIG. 1 shows an embodiment of the reading apparatus according to the present invention.

FIG. 2 shows an example of a dither-matrix.

FIGS. 3, 4 and 5 show a further embodiment of the reading apparatus according to the present invention.

DESCRIPTION OF THE PREFERRED EMBODIMENTS

Figure 4:
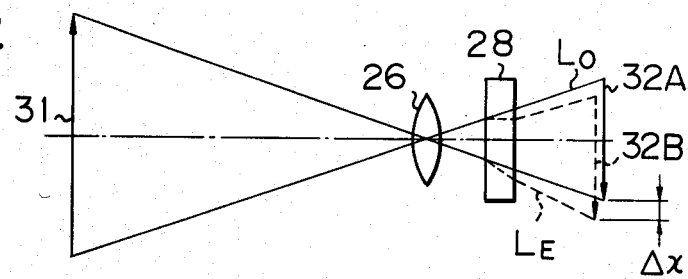

Where, as shown in FIG. 1, an original 1 is to be imaged on a solid state image pickup device 5 such as a CCD by a lens 2, if a double refraction plate 3 such as rock crystal is interposed in the image light beam of the lens 2, the original image 4B formed by an abnormal (deviated) light beam $L_E$ is deviated by $\Delta x$ in the major scanning direction a of the solid state image pickup device 5 relative to the original image 4A by a normal light beam $L_O$. The double refraction plate 3 has its optic axis Q disposed parallel to the imaging plane on which the device 5 is disposed and in inclined relationship with said major scanning direction a.

As described above, two images of an original are formed while being deviated from each other by $\Delta x$, and therefore, the filter comprising this one double refraction plate acts as an optical low-pass filter. In any case, by thus using the optical low-pass filter, the high spatial frequency component in a net-point original is cut and accordingly, the generation of pulse signals thereby is reduced, whereby it becomes possible to reduce the generation of moiré in a reproduced image.

In the above-described embodiment, the net-point original is read and signals are either processed to thereby reproduce the image, and by setting the image separating characteristic and position of the optical low-pass filter so that the amount of deviation $\Delta x$ between said two images is a value smaller than the minimum picture element constituted by a disamatrix, the deterioration of the resolving power in the reproduced image is made small and the moiré is decreased to such a degree that it proves no hindrance in practice.

This will be described in greater detail. FIG. 2 shows an example of the dither-matrix in the reproduced image. This matrix is comprised of four columns and four rows, viz., 4×4 picture elements, and the number of each picture element indicates the threshold value of each picture element. By thus dividing into sixteen parts the thresholds value selecting the signal from each photoelectric conversion element of the solid state image pickup device, the dither-matrix of FIG. 2 becomes a minimum picture element and can achieve sixteen tones. For example, as regards an image signal having a threshold value of 8 or less, the images of Nos. 1–8 of FIG. 2 are recorded. Such a dither system is well known, and for example, where the pitch of image reading by the solid state image pickup device is 16 pel (picture elements/mm) and 4×4 dither is to be effected as described above, if the separation width $\Delta x$ of the images on the solid state image pickup device by the optical low-pass filter corresponds to two picture elements, four lines/mm is the first frequency at which the resolution disappears, but if the separation width is increased beyond that, the first frequency at which the resolving power disappears will become low and the reproduced image will become impractical from the viewpoint of resolving power. Also, if said separation width $\Delta x$ is made to correspond to a picture element, there will appear a point at which the resolution is 0 for 8 lines/mm, but if the separation width is smaller than that, the moiré created by the dither-matrix and the period of the net points of the original will become conspicuous on the reproduced image, which will thus become impractical. Accordingly, a separation width $\Delta x$ of the order of $\frac{1}{4}-\frac{1}{2}$ of the size of the dither-matrix is considered to be appropriate.

FIG. 3 shows another embodiment of the reading apparatus according to the present invention, and in this embodiment, the construction of the reading apparatus is partly changed in accordance with the kind of the original.

In FIG. 3, an original 21 placed on an original supporting glass table is illuminated by a lamp 22, and the reflected light therefrom is reflected by mirrors 23, 24 and 25 and is imaged on a solid state image pickup device 27 (hereinafter referred to as the CCD 27) by a lens 26.

Change-over means, not shown, is provided between the lens 26 and the CCD 27, and a double refraction plate 28 and a flat glass plate 29 are changed over in accordance with the kind of the original.

The mirrors 23, 24 and 25 are moved in the direction of arrow 30 to effect minor scanning of the original, and major scanning is effected by the CCD 27.

The movement distance ratio of the mirror 23 to the mirrors 24 and 25 during the minor scanning is 2:1.

FIG. 4 illustrates the optical path when an original having harmonic tones is read in the present embodiment. When, for example, a net-point original 31 is set, the double refraction plate 28 is inserted between the lens 26 and the CCD 27.

In FIG. 4, the light ray from a net-point image 31 enters the double refraction plate 28, whereby it is divided into an ordinary light ray $L_O$ and an extraordinary light ray $L_3$. An image 32A and an image 32B are formed on the CCD 27 by the ordinary light ray $L_O$ and the extraordinary light ray $L_E$, respectively, with a deviation $\Delta x$ therebetween. Accordingly, the portions of the images 32A and 32B which overlap each other are read by the CCD 27, and therefore, the high frequency component is cut and the creation of moiré is reduced.

Figure 5:
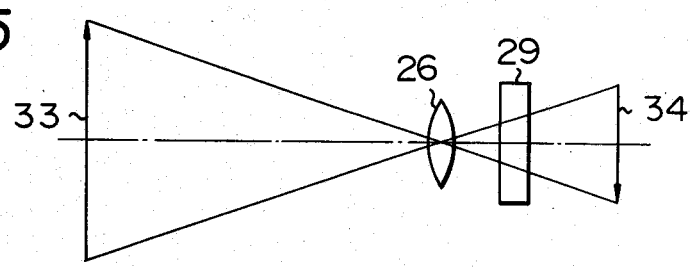

FIG. 5 illustrates the optical path when an original having no harmonic tone, such as characters or the like, is read.

When a character original is to be read in a binary form or a trinary form, the double refraction plate 28 is removed because the resolving power will be reduced if it remains inserted. However, when the double refraction plate 28 is removed, the length of the optical path between the lens 26 and the CCD 27 changes and the image formed on the surface of the CCD 27 becomes blurred. To prevent this, the flat glass plate 29 having an optical path length optically equivalent to that of the double refraction plate 28 is inserted.

In FIG. 5, the light ray from a character image 33 passes through the flat glass plate 29, whereby the optical path length is adjusted and an image 34 of high resolving power is formed on the surface of the CCD 27.

Figure 6:
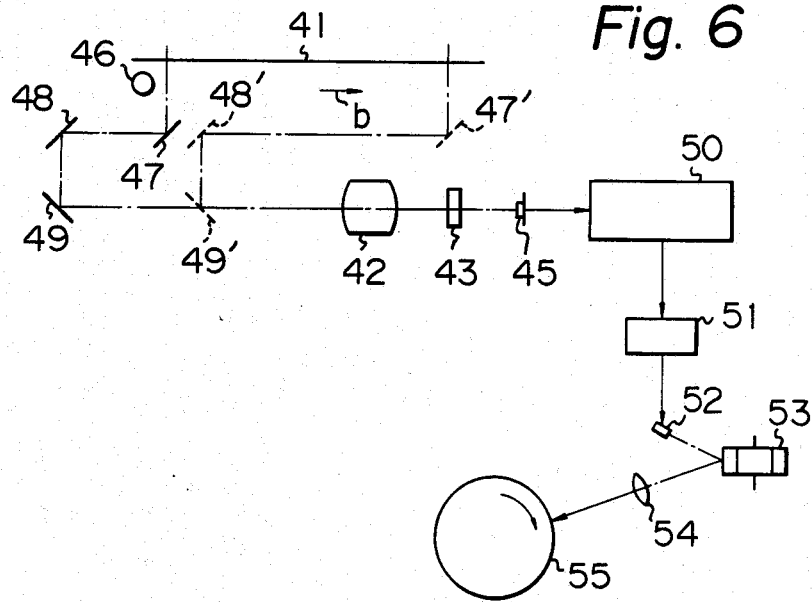
FIG. 6 shows an embodiment of the image recording apparatus utilizing the reading apparatus according to the present invention.

FIG. 6 illustrates an example of the image recording apparatus utilizing the original reading apparatus according to the present invention. In FIG. 6, reference numeral 41 designates an original (which may or may not be a net-point original), reference numeral 46 denotes a lamp for illuminating the original, and reference numerals 47, 48 and 49 designate the same mirrors as the scanning mirrors shown in FIG. 3. The mirrors 47, 48 and 49 may be moved in the direction of arrow b, thereby coming to positions 47', 48' and 49', respectively, and scan the original in the minor scanning direction b substantially perpendicular to the direction a. Alternatively, the original may be moved to effect minor scanning. Reference numeral 42 designates an imaging lens for forming the image of the original on a solid state image pickup device 45. Reference numeral 43 denotes a double refraction plate as an optical low-pass filter comprising rock crystal disposed between the lens 42 and the solid state image pickup device 45. The acting direction (the separating direction of the original image) of the double refraction plate 43 is a direction perpendicular to the plane of the drawing sheet of FIG. 6. The solid state image pickup device 45 scans the original image in the major scanning direction and photoelectrically converts it. The signal from the device 45 is supplied to a conventional dither-processing circuit 50 and is converted into a reproducing image signal by the dither system. This reproducing image signal is transmitted to a laser driving circuit 51, which thus flickeringly drives a semiconductor laser 52 in response to said reproducing image signal. Thus, the laser 52 emits a modulated laser beam corresponding to the image signal, and this beam is swept in the major scanning direction by a rotatable deflector 53 such as a polygon mirror and irradiates an electrophotographic photosensitive medium 55 rotated in the direction of the curved arrow (the minor scanning direction), through a lens 54. Thus, on the photosensitive medium 55, the image is reproduced by accumulation of dots, and the image obtained is rich in harmony because said disa system is adopted. As the electrophotographic process for forming an image on the photosensitive medium 55 and transferring it, a conventional process can be adopted. A light-emitting diode array or a liquid crystal cell array can also be adopted instead of the laser, or other image reproducing system such as a system using a multistylus can also be adopted.

Although, in the above-described embodiment, rock crystal has been shown as an example of the optical low-pass filter for obtaining multiplex image, a substance such as liquid crystal is also usable if it has the double refraction property. Further, a member such as a grating or a lenticular may be used as the low-pass filter to form multiplex images on the image pickup device.

What I claim is:

1. An apparatus for reading the image of an original, comprising:

imaging means for forming the image of the original;

a one-dimensional line sensor provided at a position where the image of the original is formed by said imaging means; and means for separating the light beam from the original provided between the original and said line sensor, said separating means separating the light beam from the original into a plurality of light beams shifted lengthwisely of said line sensor relative to each other in order to form on said line sensor a plurality of images of the original shifted lengthwisely of said line sensor relative to each other, and the amount of the image shift being a value smaller than a minimum picture element of a predetermined dither matrix.

2. An apparatus according to claim 1, wherein said separating means is formed of a substance of double refraction property which exhibits different refractive indices for light beams having planes of polarization orthogonal to each other.

3. An apparatus according to claim 2, wherein said substance of double refraction property is rock crystal.

4. An apparatus according to claim 2, wherein the amount of the image shift produced by said separating means is ¼ to ½ of the of the dither matrix.

5. An apparatus according to claim 1, further comprising means for converting the signal from said line sensor into a reproducing image signal by means of a dither system.

6. An apparatus for reading the image of an original, comprising:

scanning means for scanning the surface of the original;

an imaging optical system for imaging the light beam from said scanning means;

a one-dimensional line sensor provided at a position where the image of the original is formed by said imaging optical system, the image of the surface of the original being projected onto said line sensor by said scanning means and said imaging optical system; and an optical low-pass filter provided between said original and said line sensor, said filter separating the light beam from the original into a plurality of light beams shifted lengthwisely of said line sensor relative to each other in order to form on said line sensor a plurality of images of the original slightly shifted lengthwisely of said line sensor relative to each other, and the amount of said image shift being a value smaller than a minimum picture element of a predetermined dither matrix.

7. An apparatus according to claim 6, further comprisin· means for converting the signal from said line sensor into a reproducing image signal by means of a dither system.

8. An original reading apparatus comprising:

imaging means for forming the image of an original;

image pickup means provided at a position where the image is formed by said imaging means, said image pickup means photoelectrically converting the image of the original into an electrical signal;

means for separating the light beam from the original removably disposed between the original and said image pickup means, a plurality of images of the original being formed on said image pickup means by said separating means; and optical path length correction means for correcting the optical path length between the original and said image pickup means to hold the original and said image pickup means in an optically conjugated relation when said separating means is removed out of the optical path between the original and said image pickup means.

9. An original reading apparatus according to claim 8, wherein said optical path length correcting means is a transparent member removably provided in the optical path between the original and said image pickup means, said transparent member having an optical path length equal to that of said separating means, and further comprising changeover means for enabling removal of said separating means and substitution of said transportation member therefor.

10. An original reading apparatus according to claim 8, wherein the amount of the image separation width between the images produced by said separating means is a value smaller than a minimum picture element of a predetermined dither matrix.

11. An original reading apparatus according to claim 8, further comprising means for converting the signal from said image pickup means into a reproducing image signal by means of a dither system.

* * * * *